United States Patent

[11] 3,600,938

[72] Inventors Galen Glen Waddell
 Spokane;
 Earl Lee Phillips, Newman Lake, both of, Wash.
[21] Appl. No. 858,427
[22] Filed Sept. 16, 1969
[45] Patented Aug. 24, 1971
[73] Assignee The United States of America as represented by the Secretary of the Interior

[54] STRESS RELAXATION GAGE
 8 Claims, 4 Drawing Figs.
[52] U.S. Cl. .................................................. 73/88 E,
 33/1 H, 33/125 R
[51] Int. Cl. ................................................. G01b 7/18
[50] Field of Search .................................. 73/88 E, 84,
 151, 88.5; 33/1 H, 125; 175/50; 299/1

[56] References Cited
 UNITED STATES PATENTS
 3,416,230 12/1968 Oleson et al. ............... 73/88 E X
 3,460,258 8/1969 Geary et al. ................ 33/1
 3,481,189 12/1969 Brennan et al. ............. 73/88.5
 3,482,443 12/1969 Nichols et al. .............. 73/151
 2,599,578 6/1952 Obert et al. ................. 73/88.5

Primary Examiner—Charles A. Ruehl
Assistant Examiner—Marvin Smollar
Attorneys—Ernest S. Cohen and Gersten Sadowsky ABSTRACT: Contemporaneously with the displacement of underground medium to form an excavation, measurements of deformation in the medium surrounding the excavation are taken by an arrangement of probe sensors in boreholes drilled in this surrounding medium. Ends of the sensors projecting from the boreholes are referenced to mount structures fixed to a stable substance, such as a distance extension of the surrounding medium, and the opposite sensor ends inside the boreholes are flexibly joined to anchors embedded at the deep ends of the boreholes. Strain gages affixed to cantilevers connected between probe structures and the flexible joints produce signals when shifting of the medium moves the anchors therein with respect to the referenced probe structures. These signals are interpreted as data on deformation during excavation, and subsequently time-dependent deformation.

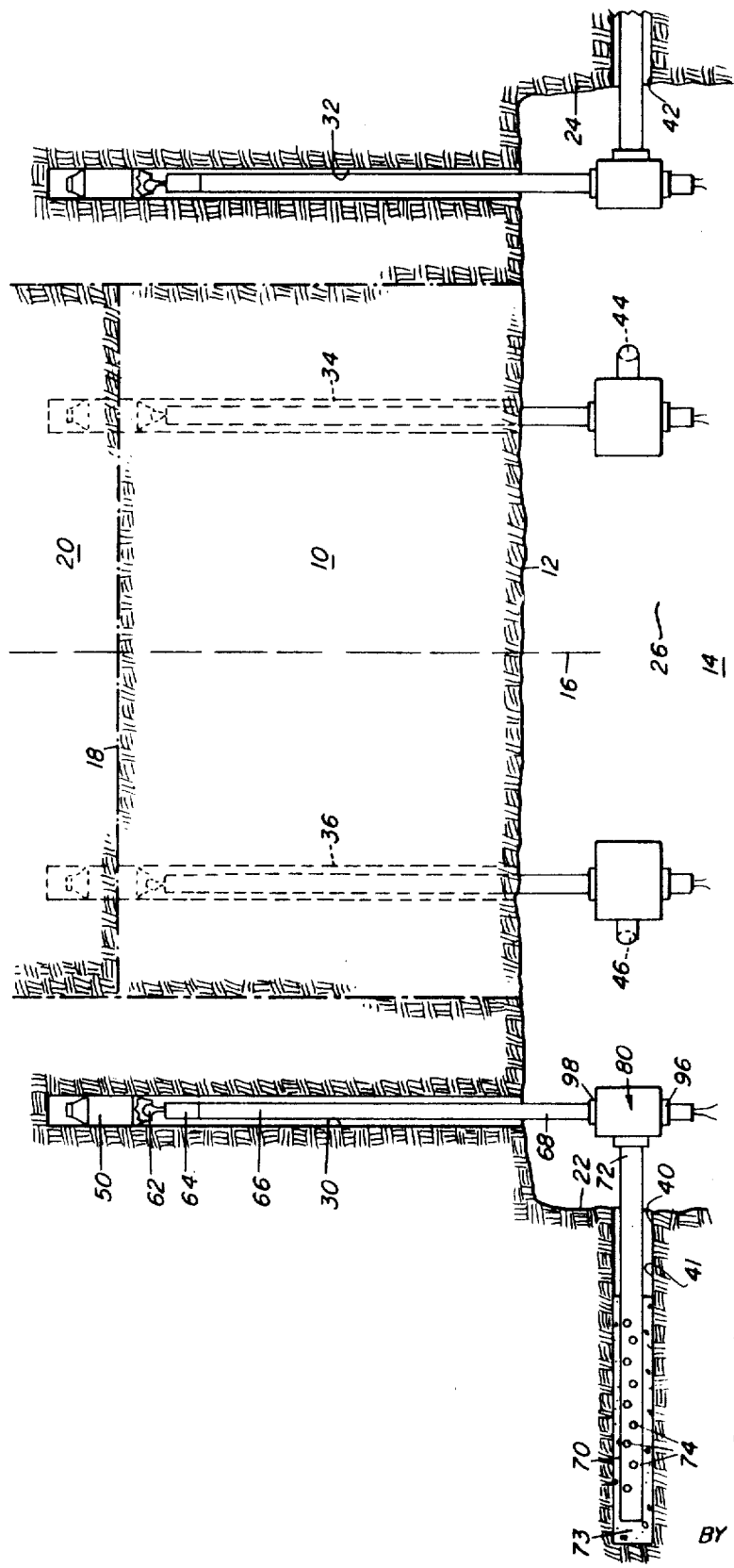

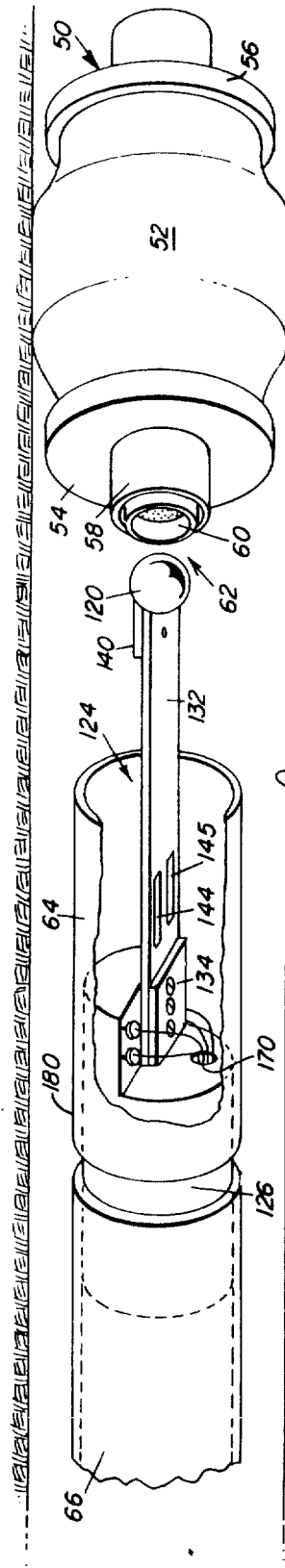
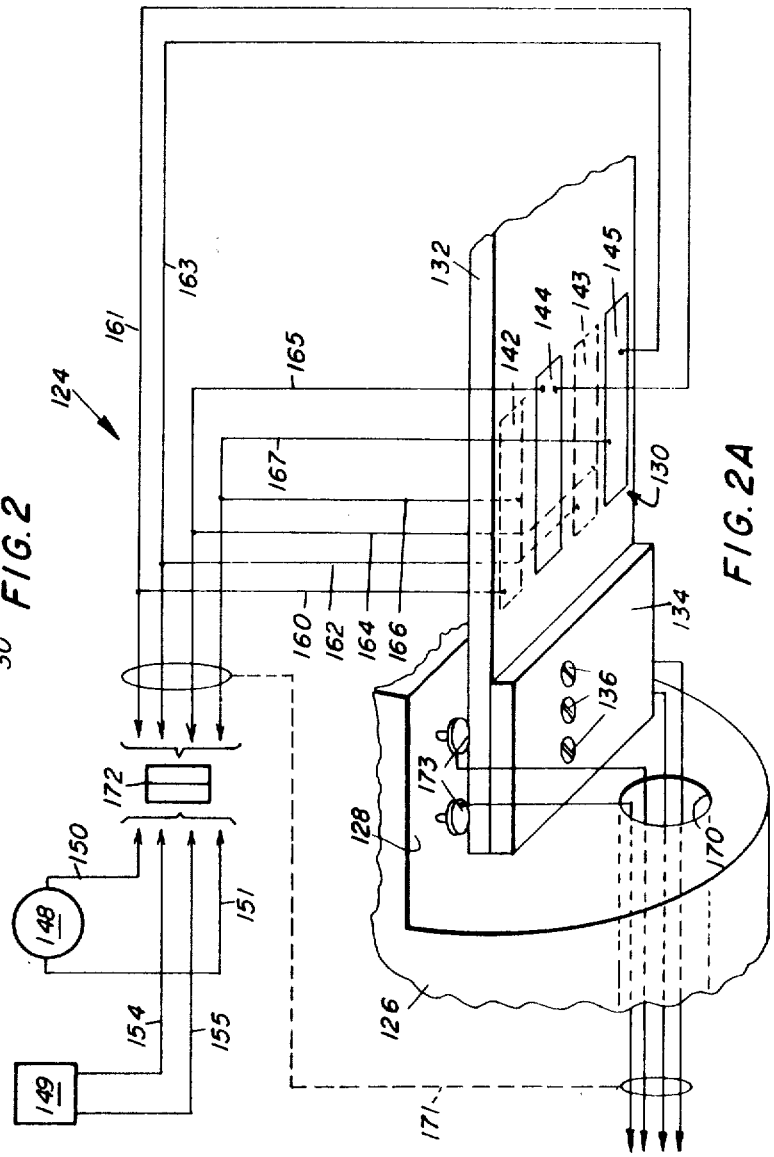

STRESS RELAXATION GAGE

BACKGROUND OF THE INVENTION

The invention is an improvement in the field of rock and soil mechanics, and is particularly applicable to measuring deformation, including time dependent deformation of the medium surrounding a tunnel-type underground opening as it is being excavated. Information derived thereby is useful in determining significant properties of this medium important to the study of its physical relationships with respect to time. Procedures previously applied in studying relationships between deformation rate, rock anisotropy and rock competence with time, required data determined over extended periods of time, such as a three months sampling period relied on to provide the basis for solving long term differential support problems. A hypothesis leading to the present invention arose from a concept that requisite data could be obtained in a shortened sampling period of a day or less by measuring initial and time dependent deformation of a full-scale tunnel during excavation.

DESCRIPTION OF THE PRIOR ART

Prior attempts to take full-scale measurements of the deformation of the medium around a tunnel at the time for initial deformation are unknown. However, measurements approximating this type of investigation have been made in an extended time period subsequent to excavation. An overcore stress-relief method which was used applied a sensing probe by positioning it in a hole which was subsequently removed from the appertaining rock wall within a core of much larger diameter. A radial deformation could be measured in this manner with a sensing probe having as an integral part thereof six sensor elements oriented radially therein. Measurements obtained were related to known rock properties to determine the in situ rock stress. A description in greater detail of this type of probe is available in the U. S. Bureau of Mines Report of Investigations 7015 entitled "Three-Component Borehole Deformation Gage For Determining the Stress in Rock" By R. H. Merrill, dated Aug. 1967. Limiting the applicability of this method is the need of at least 8 inches of competent coreable rock for a worthwhile measurement. Since a small of rock is measured in the method, and because of the heterogeneity of rock weakness planes, the results of extrapolating the data derived for the use of the results in solving full-size tunnel support problems, have been largely unsuccessful.

Other known techniques for obtaining deformation measurements employ closure measuring instrumentation with which indications of the closure of the tunnel opening are made to appear beginning sometime after the excavating system has progressed beyond the measuring site. Therefore, such techniques still do not record the initial deformation appearing when the excavation is carried on. Similar instrumentation having utility in connection with deformation measuring equipment is described in U.S. Pat. No. 3,108,716 entitled "Control Mechanism" granted to L. A. Panek on Oct. 29, 1963. Discussed therein are changeable pressure measurements taken in rock, and the significance of these measurements to possible rock deformation. Particularly noted is that control of rock displacement depends ultimately on controlling the pressure, and since pressure creates displacement, knowledge of the direction and magnitude of the rock pressure is likely to be more meaningful than knowledge of the direction of the rock displacement and deformation. Here again as with the aforementioned borehole deformation gage, the measurements are made in a small borehole and reflect change in the boreholes immediate medium only; whereas the present invention does not measure the change in a diameter of a borehole, but total radial displacement of the medium around any size adjacent opening. Moreover, because of the real time nature of the deformation data gained by the present invention, it is of greater importance to an understanding of tunneling and similar excavating operations than deformation data derived by the prior methods.

SUMMARY OF THE INVENTION

A prime objective of the invention is to measure the displacement of walls forming an underground opening when such opening is created, as in advancing the working face of a mine tunnel. Outside the periphery of the proposed excavation and uniformly spaced about the opening to be made, boreholes are drilled to a uniform depth. A corresponding number of boreholes are drilled in stable rock such as may be found in adjacent sidewalls of the threshold tunnel. Rigid supports cemented in the further boreholes reference the positions of mounting heads affixed to these supports. An anchor component is fixedly placed at the deep end of each of the peripheral boreholes, and a sensing probe mounted in each of the aforesaid heads extends into the corresponding peripheral borehole and joins the fixed anchor in a flexible connection. The head thus effectively couples a sensing probe to a stable reference base whereby the probe is maintained in fixed position out of contact with the borehole surface. An arrangement of electrical strain gages are affixed to a cantilever sensor structure at the end of each probe, and the extended end of this cantilever is yieldingly held by the flexible connection. However, displacement of the anchors with the deformation, due to excavation in the proposed tunnel, bends the strain gages accordingly. Readouts from the gages to meter circuits provide data on which measurements of the extent and direction of the resulting deformations are based.

This and other objects and advantages of the invention will be more clearly understood from the following description of a preferred embodiment of the invention considered together with the accompanying drawing wherein:

FIG. 1 is a plan view in cross section through a longitudinal center line of an excavation site in a tunnel which is equipped with the present invention;

FIG. 2 is a cross-sectional view of one of the boreholes appearing in FIG. 1 as containing a probe structure and anchor, and revealing in a cutaway representation details of a sensor assembly;

Figure 3:
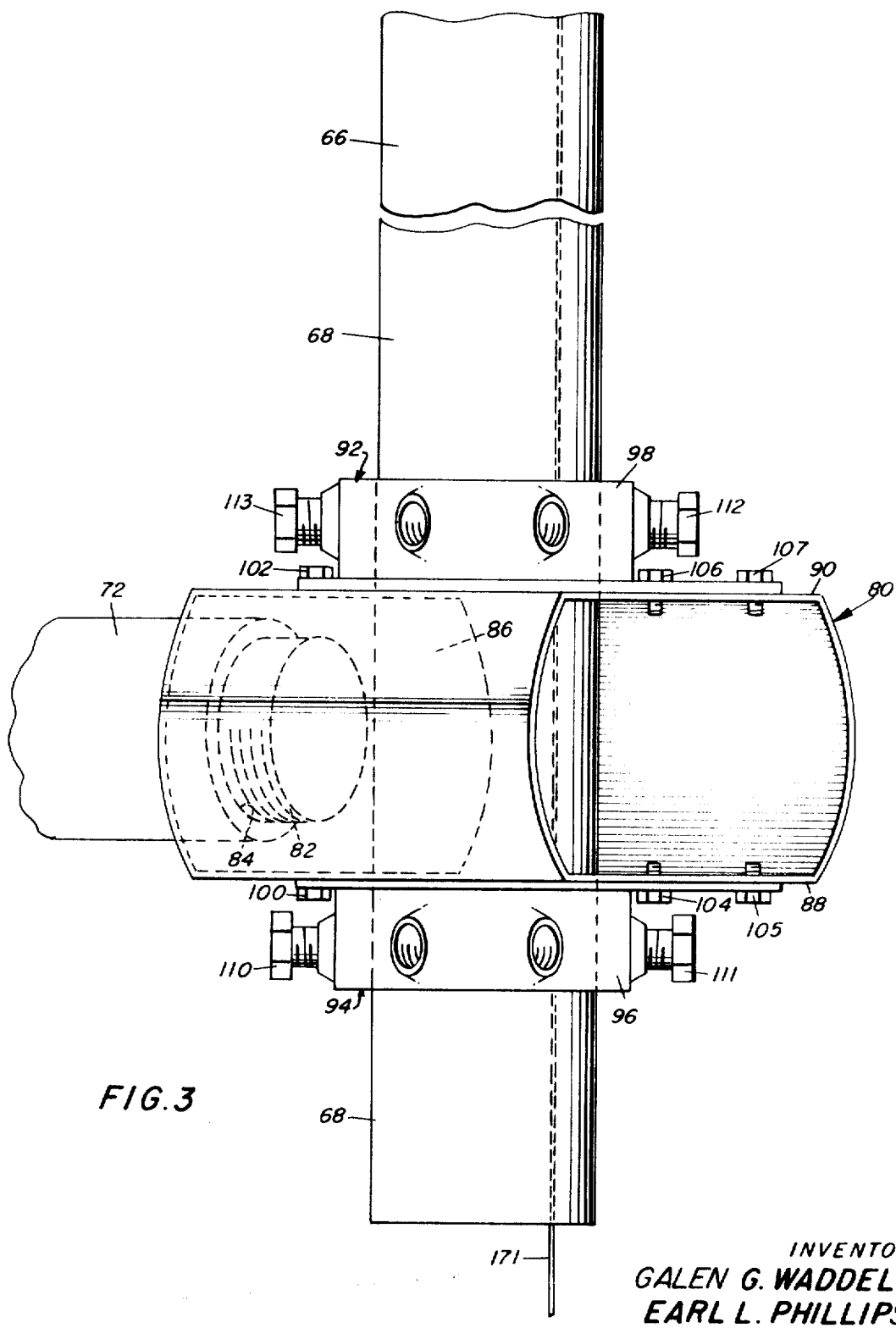

FIG. 2A presents a fragmentary showing of the sensor assembly of FIG. 2 in which details of electrical parts and connections are schematically represented; and FIG. 3 is a showing of the mounting head applied to couple a tubular support of the sensing probe to a referencing rigid beam.

Referring to FIG. 1, a first proposed excavation 10 is indicated as starting at a working face 12 in an underground tunnel 14, and as culminating in an extension of tunnel 14 following a longitudinal axis 16 thereof to a further working face 18 of a second proposed excavation 20. Also appearing are side walls 22 and 24, and a floor 26, which together with a roof (not shown), define the surfaces constituting the preexisting tunnel 14 terminating at working face 12. In the embodiment disclosed herein, six boreholes of like dimensions are uniformly arranged around the tunnel extension to be completed by excavation 10, whereby these boreholes are aligned parallel to tunnel axis 16 spaced at approximately a foot outside the periphery of the tunnel extension. In addition to the four boreholes 30, 32, 34 and 36 shown in FIG. 1, two further parallel boreholes (not shown) are disposed in the upper part of the tunnel. The walls defining preexisting tunnel 14 have six additional boreholes which are placed radially disposed with respect to tunnel axis 16, and located about the tunnel in correspondence with and adjacent to the aforesaid axially aligned boreholes. Also appearing in FIG. 1 are openings 40, 42, 44 and 46 from which the radial boreholes extend into walls 22 and 24, and floor 26, such that their longitudinal axes are at right angles to the longitudinal axes of the parallel boreholes which positionally correspond thereto. Two other radially disposed boreholes (not shown), are provided in the tunnel roof where they correspond to the parallel boreholes near the roof in the manner heretofore explained. Although six boreholes of each disposition are designated for the instant embodiment, as few as three boreholes of each type may be used in connection with the invention.

Operationally associated with each pair of perpendicularly disposed boreholes is a deformation sensing apparatus. Since the sensing apparatus for the six borehole pairs are alike, an exemplary disclosure of one such apparatus follows with reference being made to the borehole pair including borehole 30. An anchor unit 50 is placed adjacent the inner or deep end of borehole 30, where it is partially situated a short distance into the working face 18. Referring now to FIG. 2, an expanded cylinder 52, capped on its ends by covers 54 and 56, will be seen as constituting the anchor body. A length of pipe 58, supported in cover openings, extends axially through cylinder 52 and has ends projecting outside the covers. Within one of these ends is secured a caplike socket 60 which constitutes part of a flexible connection 62 to be hereinafter more fully described. The anchor shown herein as having utility in the present invention includes explosive deformation means whereby it is expanded so as to be held by contact pressure on the surface of borehole 30, as shown in FIG. 2. A further description of the anchor is given in U.S. Pat. No. 3,401,461, entitled "Explosive Centerhole Anchor," and issued Sept. 17, 1968 to E. W. Parsons et al.

As is hereinafter explained in detail, anchor 50 functions as an actuator for a strain sensing probe assembly 64 which in turn is steadily maintained in operative position by an elongated tubular element 66. An extended end 68 of tubular element 66 projects from borehole 30 along the longitudinal axis thereof. Through opening 40, and within a borehole 41 extending therefrom, is received an elongated round beam 70, which, as best seen in FIG. 1, is of such length as to span nearly the full length of borehole 41, and have an end portion 72 thereof project outside the borehole. Beam 70 is rigidly fixed with respect to wall 22 by sand and expandable cement 73 charged into borehole 41 so as to become distributed about the surfaces of the beam and protuberances 74 thereon. Thus, the beam's projected end 72 is fixedly maintained directed along the longitudinal axis of borehole 41, which as hereinbefore indicated, is disposed perpendicular to the longitudinal axis of borehole 30 and end 68 of tubular support element 66.

Projected end 72 of beam 70 has attached thereto a generally rectangular casing structure which constitutes an adjustable coupler 80 in that it serves to affix tubular element 66 to the beam in a requisite manner. Turning now to FIG. 3, it will be seen that beam end 72 terminates in a threaded portion 82 which engages threads of an opening 84 in an end plate 86 of coupler 80. Sideplates 88 and 90 and end plate 86, are suitably joined together with conformable top and bottom pieces to make up the coupler. Flanged clamps 92 and 94 are affixed to coupler sides 88 and 90, respectively, where the clamps' collar parts 96 and 98 have openings located over slightly larger openings in the sides. Clamps 92 and 94 are initially retained to pivot on coupler sides 88 and 90 by screws 100 and 102 through the flanges whereby more precise alignment of the collar openings is made possible to facilitate the receipt therein of tubular support 66. Further screws 104 to 107 are thereafter applied through arcuate slots in the flanges to securely maintain the clamps in adjusted position by fastening into the coupler sides. An array of threaded radial openings through collar parts 96 and 98 receive therein adjustable fasteners, such as bolts 110 to 113, which allow a fine positioning of the tubular element along the longitudinal axis of borehole 30.

Strain sensing probe assembly 64 is supported on the inserted end of tubular element 66 so as to locate this assembly at a depth in borehole 30 where a ball fitting 120 at the leading end of the assembly is received in socket 60 of fixed anchor 50. The aforesaid adjustments and alignments made possible by the structure of coupler 80, which properly position tubular element 66, shift this element about the pivot established in connection 62 by ball fitting 120 in socket 60. When the tubular element is thereby appropriately centered, it is out of contact with the wall surfaces of borehole 30. More particularly, probe assembly 64 is arranged between the tubular element and the anchored ball and socket connection to properly situate a strain gage device 124 thereof for operation in the borehole. A solid cylindrical base part 126 of assembly 64 is fitted at one end thereof into the front end opening of tubular element 66, and secured therein. A semicylindrical opposite end of base part 126 provides a plane surface 128, through the center thereof, to which is fastened a cantilever sensor 130. A relatively narrow flexible bar 132, fastened at one end thereof against base part surface 128 by a holddown block 134 and traversing screws 136, constitutes a centrally disposed cantilever of the sensor. Ball fitting 120 is attached by a stub block 140 thereof to the extended end of bar 132 where it functions as the aforesaid spherical support adapted to be borne within socket 60 of connection 62.

Areas on the top and bottom surfaces of bar 132, adjacent to its attachment to surface 128, appear in FIG. 2A as having affixed thereto strain gage pairs 142 and 143, and 144 and 145, respectively. Strain gages of any typical design, employing conductors of small cross section arranged parallel to the major dimension of bar 132, have utility in the present invention. A conventional bridge circuit, such as is schematically shown in FIG. 2A, is applicable to gain deformation data from signals derived in the aforesaid strain gages. A source of voltage 148, and a readout meter 149 of this bridge circuit are shown in the figure as connected to the strain gages by way of leads 150 and 151, and leads 154 and 155, respectively. Leads 150 and 151 have their connections completed to gages 142 and 144, and gages 142 and 145, respectively, by way of leads 160 and 161, and leads 166 and 167, respectively. Leads 154 and 155 have their connections completed to gages 143 and 145, and gages 143 and 144, respectively, by way of leads 162 and 163, and leads 164 and 165, respectively. The leads connecting remotely located voltage source 148 and meter 149 with the gages actually extend through a passage 170 and probe base part 126, as indicated by dashed line and collars 171, and thence through tubular element 66 and a coupling connection 172. Conventional terminals affixed in base part surface 128, as exemplified by posts 173, serve to effect the immediate connections between source and meter leads and the strain gage leads. Sensing probe assembly 64 is completed by a short tubular sleeve 180 fitted over and secured to a portion of base part 126 whereby it extends over the gages and a part of cantilever 132 to constitute a protective cover for sensor device 124.

Set out hereinbelow is a procedure for measuring initial and time dependent deformation of the medium surrounding a tunnel-type underground opening as it is being excavated and a period following, respectively, according to the present invention. In connection therewith reference is made to the structural embodiment previously described.

On the surface of the wall encircling the area through which excavation proceeds, or working face 12, and at a short distance from the excavation proper, uniformly spaced marks are made to designate points whereat boreholes are to be drilled parallel to the longitudinal axis 16 of the proposed passage or tunnel. Stable walls, represented in FIG. 1 by surfaces 22 and 24 of a preexisting tunnel leading to the proposed passage and located adjacent to the encircling surface, are correspondingly marked for boreholes to be drilled radially disposed with respect to the aforesaid longitudinal axis, so that their axes are perpendicular to the parallel boreholes. After the aforesaid radial boreholes 41 are drilled, each receives a rigid tube or beam 70 which is cemented therein with an end part 72 thereof extending outside the borehole. An adjustable coupler head 80 is centrally disposed and secured on the extended end of the beam part. The parallel boreholes 30 are then drilled, and an anchor 50, equipped with one part 60 of a flexible connector 62, is solidly affixed at the inner end of each of the parallel boreholes with its connector part facing out.

A sensing probe arrangement, including a sensor assembly 64 attached to the end of an elongated support 66, is inserted through adjustable openings in each of the coupler heads so as to extend from this mount therefor and into a parallel borehole corresponding thereto. A cantilever sensor 124 of each of the aforesaid assemblies carries a complementary connector part 120 for the flexible connection 62 which facilitates this connection as the probe arrangement is placed in the parallel borehole and adjusted in and by the coupler head openings to situate the probe arrangement so that no part thereof comes into contact with the borehole surface. Electrical strain gages arranged on each cantilever sensor of the respective assemblies have circuit leads extending back through supporting structure of the probe to reach a monitoring station at a relatively remote point. The calibrating of such strain gages is disclosed in the U.S. Bureau of Mines Report of Investigations 5978, entitled "Borehole Deformation Gage for Determining The Stresses In Mine Rock," by L. A. Obert, R. H. Merrill, and T. A. Morgan, dated May 1962. Also demonstrated is that with knowledge of rock medium elastic constants consideration of borehole deformation measurements facilitates the calculation of direction and magnitude of the principal stresses in the rock medium.

The procedure set out accomplishes referencing of points in the wall of a future opening, such as working face 18 in a plane defined by the anchors, to steadied points established by rigid beams cemented in a stable wall. Consequently, as excavation 10 progresses and the walls adjacent the opening move, the anchors made integral therewith also move, whereas the stabilized probe support structures do not move since they do not touch the rock of the nearby surrounding medium. However, movement of the anchor bends the cantilevers of the sensor assemblies which are otherwise held rigid with respect to the stable walls. When a cantilever lengthens or shortens upon bending, the strain gages thereon cause a change in electrical resistance which through a calibrated readout instrument at the monitoring station can be interpreted to show exact movement of a tunnel wall during excavation. These measurements and rate of movement data can be combined with other known rock property data and used to produce information on rock anisotropy, and in situ rock stress, including, for example, the determination of the distribution in a plane of stress around underground openings, ground in problem areas, and artificial supports. Also made possible is continuous recording of rock deformation around an underground opening as the opening is being excavated. Use of the described procedure and system permits total radial displacement of the wall rock around an excavation as it is created to be measured to an accuracy of ±0.00005 inch. As is well understood in the art, the magnitude and direction of rock deformation are functions of interrelated parameters including in situ stress field, the opening geometry, the physical properties of the rock and geological features such as fracture orientation, and frequency and cohesiveness of the rock. Thus, measured displacements of the rock medium as hereinbefore described, indicate the effect of the foregoing causes of the deformation. Further, measurements taken in accordance with the present invention at the full-scale opening as it is excavated, reflect the effects of gross rock features in contrast to those of the prior art where only localized features are obtained when diametrical change in small boreholes is measured. Consequently, measured and derived data and information provided by use of the invention allows a requisite understanding of the fitness or competence of the rock medium for pursuing therein an excavation extending an underground opening into a tunnel.

Other means of supporting the sensing probe arrangement may be employed for the procedure as long as provision is made for a stable medium to which the probe reference structure can be fixed. Thus, the boreholes alongside the proposed excavation might be extended, and the sensing probes placed in the holes with their reference support ends first whereby such ends can be cemented at the deepest points of the holes. With the remainder of the probes supported so that they do not touch the rock of their holes, the anchors could be inserted in the holes and positioned at the points where information on the ground movement is desired. Other transducers than strain gages can be used. A linear variable differential transformer can be attached to the sensing probe arm. The differential transformer could be attached to the wall of a borehole and the core attached to the sensing probe. Movement of the transformer by rock shift gives rise to electrical output proportioned to its displacement in relation to the core. A similar arrangement could be made using a potentiometer for the transducer. Instead of using a fixed anchor 50 (either explosive type or cemented in hole) a post may be fixed to cantilever 132 replacing the ball fitting 120. The post extends to the borehole wall facilitating a measure of the displacement of that point. However none of these alternatives are as stable as the strain gage transducer described in the preferred embodiment since they would be more subject to vibrations not originating with the rock being monitored.

While a preferred embodiment and procedure for the invention has been described and illustrated, it is to be understood that the invention is not limited thereby but is susceptible to changes in form and detail.

I claim:

1. A method for measuring deformation in walls of a tunnel during excavation thereof from a working face at an end of a preexisting passage leading thereto comprising:

drilling a first plurality of substantially aligned holes to extend from the openings thereof spaded around in an area on said working face surrounding the periphery of the opening said excavation is to make in said working face approximately perpendicularly to said working face;

drilling in areas of stable walls forming said preexisting passage, which are adjacent to said working face, a second plurality of holes having openings, respectively spaced around in correspondence with said first hole openings;

constituting contiguous to the deep end of each of said first holes an anchor supporting an articular connective element, and inserting thereafter, so as to join with said anchor at said connective element, a strain data sensing probe having an end extending outside said hole whereby the longitudinal axes of said probes cross extensions of longitudinal axes of said second holes;

affixing in each said second hole, substantially along said axis thereof, a beam having an end thereof extending outside said hole and disposed adjacent said outside probe extension;

coupling each said adjacent beam and sensing probe ends outside their respective holes whereby each sensing probe is maintained stabilized with respect to said walls of said preexisting passage, and centered in said working face holes out of contact with the walls thereof, and reading signal outputs of said plurality of sensing probes as said excavation progresses to form a tunnel extension of said preexisting passage whereby the derivation of rock competence information on said tunnel walls is enabled and wherefrom support problems of subsequent excavations to further extend said tunnel walls can be anticipated.

2. The method of claim 1 wherein said first and second pluralities of hole openings are uniformly spaced apart in first and second planes, respectively, whereby overall measurements of radial displacements of the wall rock around an excavation as it is created are facilitated.

3. An apparatus for measuring deformation in the medium defining a tunnel being excavated employing a plurality of deformation measuring mechanisms separately located in individual holes through said medium spaced around said excavation, each said mechanism comprising:

an individual anchor affixed at the internal end of each one of said individual holes and each said anchor having a fixed connective component as an integral part thereof;

a sensing probe situated in each one of said individual holes, said probe including a deformation sensing head, a tubular support element having an end inserted into said individual hole corresponding to said probe comprising said support element, and a part extending through and outside said corresponding individual hole, said sensing head being affixed at one end to said inserted end of said support element and having affixed on another end an operational element, said operational element having secured thereto, adjacent said another end of said sensing head, an arrangement of electrical strain gages, and attached to said operational element, at an end thereof extended toward said fixed connective component, a further connective component complementarily fitting together with said connective element;

a means retained substantially rigid with respect to a stable surface adjacent said tunnel excavation working face, having attached thereto a coupling means wherein is securely attached said tubular support element whereby said sensing probe is maintained centered in said hole and out of contact with the surfaces thereof; and a means to read out strain data signals generated by said strain gages during said excavation.

4. The apparatus of claim 3, wherein said anchor comprises a metallic enclosure containing an explosive adapted to be detonated in said hole whereby a resulting expansion of said enclosure forces walls thereof upon surfaces inside said hole.

5. The apparatus of claim 3, wherein said sensing head comprises a cylindrical mount partially fitted and secured within said tubular support element, and the extension thereof outside said tubular element having a carrier surface to which is secured said one end of said operational element and said electrical strain gages being symmetrically disposed on opposite surfaces of said operating element.

6. The apparatus of claim 5 wherein said operational element is a flat narrow strip constituting a cantilever having said one end thereof fixed to said cylindrical mount carrier surface, and the other end thereof supported by said connective components.

7. The apparatus of claim 3 wherein said further and fixed connective components constitute a ball and socket link between said anchor and said sensing probe.

8. The apparatus of claim 3 wherein said means retained substantially rigid with respect to a stable surface is an elongated beam having a major part thereof made integral with the medium constituting said surface and the extended end thereof outside said medium, said coupling means is a casing having aligned openings in parallel walls thereof and a further opening in a wall at right angles to said parallel walls, said extended end of said beam having means rigidly securing said end into said further casing wall, an adjustable plate operative on each of said parallel walls and adapted to be fixed in adjusted position, each said plate having a collar defining an opening therein alignable with said wall openings at said adjusted position, said tubular support element outside said hole having parts residing in said wall openings and collars, and adapted to be rigidly attached to said casing by fastenings in said collars.